United States Patent
Koganti et al.

(10) Patent No.: US 9,742,693 B2
(45) Date of Patent: Aug. 22, 2017

(54) DYNAMIC SERVICE INSERTION IN A FABRIC SWITCH

(71) Applicant: BROCADE COMMUNICATIONS SYSTEMS, INC., San Jose, CA (US)

(72) Inventors: Phanidhar Koganti, Hyderabad (IN); Suresh Vobbilisetty, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 44 days.

(21) Appl. No.: 13/776,217

(22) Filed: Feb. 25, 2013

(65) Prior Publication Data

US 2013/0223449 A1 Aug. 29, 2013

Related U.S. Application Data

(60) Provisional application No. 61/603,817, filed on Feb. 27, 2012.

(51) Int. Cl.
*H04L 12/933* (2013.01)
*H04L 12/931* (2013.01)
*H04L 12/751* (2013.01)

(52) U.S. Cl.
CPC ............ *H04L 49/10* (2013.01); *H04L 45/026* (2013.01); *H04L 49/355* (2013.01); *H04L 49/70* (2013.01); *H04L 49/356* (2013.01)

(58) Field of Classification Search
None
See application file for complete search history.

(56) References Cited

U.S. PATENT DOCUMENTS

| | | |
|---|---|---|
| 829,529 A | 8/1986 | Keathley |
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrli, III |
| 5,983,278 A | 11/1999 | Chong |

(Continued)

FOREIGN PATENT DOCUMENTS

| | | |
|---|---|---|
| CN | 1735062 | 2/2006 |
| CN | 101064682 | 10/2007 |

(Continued)

OTHER PUBLICATIONS

Louati, Wajdi et al., "Network-Based Virtual Personal Overlay Networks Using Programmable Virtual Routers", 2005.

(Continued)

*Primary Examiner* — Hong Cho
(74) *Attorney, Agent, or Firm* — Shun Yao; Park, Vaughan, Fleming & Dowler LLP

(57) ABSTRACT

One embodiment of the present invention provides a switch. The switch includes a service management module and a packet processor. During operation, the service management module identifies a service provided by an appliance coupled to the switch via a local port. The packet processor constructs a notification message for a remote switch. The notification message includes information about the service and the appliance. In this way, the switch allows the remote switch to request the service.

21 Claims, 12 Drawing Sheets

(56) References Cited

U.S. PATENT DOCUMENTS

| | | |
|---|---|---|
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla et al. |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute et al. |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha et al. |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman et al. |
| 8,462,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 9,178,793 B1 | 11/2015 | Marlow |
| 9,350,680 B2 | 5/2016 | Thayalan |
| 9,401,818 B2 | 7/2016 | Venkatesh |
| 9,438,447 B2 | 9/2016 | Basso |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi et al. |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0008868 A1 | 1/2004 | Bornowski |

(56) References Cited

U.S. PATENT DOCUMENTS

| | | |
|---|---|---|
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0098589 A1 | 5/2006 | Kreeger |
| 2006/0126511 A1 | 6/2006 | Youn |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |

(56) References Cited

U.S. PATENT DOCUMENTS

| | | |
|---|---|---|
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1* | 7/2010 | Shukla et al. ................ 709/220 |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp et al. |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty et al. |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1* | 1/2012 | Dunbar et al. ........... 370/395.53 |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |

(56) References Cited

U.S. PATENT DOCUMENTS

| | | |
|---|---|---|
| 2012/0131289 A1* | 5/2012 | Taguchi et al. ............... 711/162 |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha et al. |
| 2013/0301642 A1 | 11/2013 | Radhakrishnan et al. |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan et al. |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0105034 A1 | 4/2014 | Sun |
| 2014/0157251 A1 | 6/2014 | Hocker |
| 2014/0241147 A1 | 8/2014 | Rajagopalan |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Velayudhan et al. |
| 2015/0010007 A1 | 1/2015 | Matsuhira |
| 2015/0030031 A1 | 1/2015 | Zhou |
| 2015/0110487 A1 | 4/2015 | Fenkes |
| 2015/0127618 A1 | 5/2015 | Alberti |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2017/0026197 A1 | 1/2017 | Venkatesh |

FOREIGN PATENT DOCUMENTS

| | | |
|---|---|---|
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 1916807 A2 | 4/2008 |
| EP | 2001167 A1 | 10/2008 |
| EP | 2001167 A1 | 12/2008 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Knight, Paul et al., "Network based IP VPN Architecture using Virtual Routers", May 2003.
Kreeger, L. et al. "Network Virtualization Overlay Control Protocol Requirements draft-kreeger-nvo3-overlay-cp-00", Aug. 2, 2012.
An Introduction to Brocade VCS Fabric Technology, Dec. 3, 2012.
Knight, Paul et al. "Layer 2 and 3 Virtual Private Networks: Taxonomy, Technology, and Standardization Efforts", 2004.
Narten, T. et al. "Problem Statement: Overlays for Network Virtualization draft-narten-nvo3-overlay-problem-statement-01", Oct. 31, 2011.

(56) References Cited

OTHER PUBLICATIONS

The Effortless Network: HyperEdge Technology for the Campus LAN, 2012.
FastIron and TurbuIron 24x Configuration Guide, 2010.
FastIron Configuration Guide, Supporting IronWare Software Release 07.0.00, 2009.
Foundary FastIron Configuration Guide, Software Release FSX 04.2.00b, Software Release FWS 04.3.00, Software Release FGS 05.0.00a, 2008.
Brocade Unveils "The Effortless Network", 2009.
Office Action for U.S. Appl. No. 13/092,752, filed Apr. 22, 2011, dated Jul. 18, 2013.
Office Action for U.S. Appl. No. 13/184,526, filed May 22, 2013, dated May 22, 2013.
Office Action for U.S. Appl. No. 13/365,993, filed Feb. 3, 2012, dated Jul. 23, 2013.
Office Action for U.S. Appl. No. 13/365,808, filed Feb. 3, 2012, dated Jul. 18, 2013.
Christensen, M. et al., "Considerations for Internet Group Management Protocol (IGMP) and Multicast Listener Discovery (MLD) Snooping Switches", May 2006.
Perlman, Radia et al., "RBridges: Base Protocol Specification", <draft-ietf-trill-rbridge-protocol-16.txt> Mar. 2010.
Brocade Fabric OS (FOS) 6.2 Virtual Fabrics Feature Frequently Asked Questions, 2008.
Eastlake III, Doanld et al., "RBridges: TRILL Header Options" <draft-ietf-trill-rbridge-options-00.txt>, Dec. 2009.
Perlman, Radia "Challenges and Opportunities in the Design of TRILL: a Routed layer 2 Technology", 2009.
Perlman, Radia et al., "RBridge VLAN Mapping" <draft-ietf-trill-rbridge-vlan-mapping-01.txt>, Dec. 2009.
Knight, S. et al., "Virtual Router Redundancy Protocol", Apr. 1998. "Switched Virtual Internetworking Moves Beyond Bridges and Routers", 8178 Data Communications 23 Sep. 1994, No. 12.
Touch, J. et al. "Transparent Interconnection of Lots of Links (TRILL): Problem and Applicability Statement", May 2009.
Lapuh, Roger et al., "Split Multi-link Trunking (SMLT)", Oct. 2002.
Lapuh, Roger et al., "Split Multi-link Trunking (SMLT) draft-lapuh-network-smlt-08", Jan. 2009.
S. Nadas et al., "Virtual Router Redundancy Protocol (VRRP) Version 3 for IPv4 and IPv6", Mar. 2010.
Office Action for U.S. Appl. No. 13/312,903, filed Dec. 6, 2011, dated Nov. 12, 2013.
Office Action for U.S. Appl. No. 13/194,526, filed Jul. 16, 2011, dated Dec. 2, 2013.
Office Action for U.S. Appl. No. 13/092,460, filed Apr. 22, 2011, dated Mar. 14, 2014.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
Office Action for U.S. Appl. No. 13/092,701, filed Apr. 22, 2011, dated Mar. 26, 2014.
Office Action for U.S. Appl. No. 13/092,724, filed Apr. 22, 2011, dated Apr. 9, 2014.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17 . . . .
'RBridges: Base Protocol Specification', IETF Draft, Perlman et al., Jun. 26, 2009.
Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Office Action dated Apr. 9, 2014, U.S. Appl. No. 13/092,724, filed Apr. 22, 2011.
Office action dated Aug. 29, 2014, U.S. Appl. No. 13/042,259, filed Mar. 7, 2011.
Office Action dated Mar. 14, 2014, U.S. Appl. No. 13/092,460, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office action dated Aug. 21, 2014, U.S. Appl. No. 13/184,526, filed Jul. 16, 2011.
Office Action dated Mar. 6, 2014, U.S. Appl. No. 13/425,238, filed Mar. 20, 2012.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n. vo3-over I ay-problem -statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.

(56) References Cited

OTHER PUBLICATIONS

Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/533,843, filed Jun. 26, 2012, dated Oct. 21, 2013.
Office Action for U.S. Appl. No. 13/598,204, filed Aug. 29, 2012, dated Feb. 20, 2014.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 and IPv6', Internet Engineering Task Force, Mar. 2010.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
Brocade 'Brocade Unveils'The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,808, filed Jul. 18, 2013, dated Jul. 18, 2013.
Office Action for U.S. Appl. No. 13/092,887, dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.

(56) References Cited

OTHER PUBLICATIONS

Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Lapuh, Roger et al., 'Split Multi-link Trunking (SMLT) draft-lapuh-network-smlt-08', Jan. 2009.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.

(56) References Cited

OTHER PUBLICATIONS

Office Action dated Apr. 1, 2015 U.S. Appl. No. 13/656,438 filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al., Mar. 2017.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.

\* cited by examiner

DYNAMIC SERVICE INSERTION IN A FABRIC SWITCH

RELATED APPLICATIONS

This application claims the benefit of U.S. Provisional Application No. 61/603,817, titled "Dynamic Service Insertion in Ethernet Fabric Switch," by inventors Phanidhar Koganti and Suresh Vobbilisetty, filed 27 Feb. 2012, the disclosure of which is incorporated by reference herein.

The present disclosure is related to:

U.S. patent application Ser. No. 13/087,239, titled "Virtual Cluster Switching," by inventors Suresh Vobbilisetty and Dilip Chatwani, filed 14 Apr. 2011;

U.S. patent application Ser. No. 13/092,724, titled "Fabric Formation for Virtual Cluster Switching," by inventors Shiv Haris and Phanidhar Koganti, filed 22 Apr. 2011;

U.S. patent application Ser. No. 13/092,580, titled "Distributed Configuration Management for Virtual Cluster Switching," by inventors Suresh Vobbilisetty, Shiv Haris, Phanidhar Koganti, and Vidyasagara R. Guntaka, filed 22 Apr. 2011;

U.S. patent application Ser. No. 13/042,259, titled "Port Profile Management for Virtual Cluster Switching," by inventors Dilip Chatwani, Suresh Vobbilisetty, and Phanidhar Koganti, filed 7 Mar. 2011; and U.S. patent application Ser. No. 13/092,752, titled "Name Services for Virtual Cluster Switching," by inventors Suresh Vobbilisetty, Phanidhar Koganti, and Jesse B. Willeke, filed 22 Apr. 2011;

the disclosures of which are incorporated by reference herein.

BACKGROUND

Field

The present disclosure relates to network management. More specifically, the present disclosure relates to dynamic insertion of services in a fabric switch.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as service insertion and provisioning, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic is becoming more diverse, efficient and accurate configuration of essential services, such as firewalls, load-balancers, and intrusion detection, in a high-performance layer-2 network is becoming progressively more important as a value proposition for network architects. It is desirable to provide these services from a variety of physical and virtual appliances at distributed locations with flexibility and ease of deployment.

While a fabric switch brings many desirable features to a network, some issues remain unsolved in dynamic service insertion in the network.

SUMMARY

One embodiment of the present invention provides a switch. The switch includes a service management module and a packet processor. During operation, the service management module identifies a service provided by an appliance coupled to the switch via a local port. The packet processor constructs a notification message for a remote switch. The notification message includes information about the service and the appliance. In this way, the switch allows the remote switch to request the service.

In a variation on this embodiment, the switch also includes a virtualization module which operates in conjunction with the packet processor to represent the appliance as a virtual appliance in the notification message. The virtual appliance can be associated with one or more appliances providing the service.

In a further variation, the packet processor constructs a second notification message comprising a virtual identifier of a virtual switch. This virtual switch is associated with the switch and presented to be coupled to the virtual appliance. The virtualization module generates the virtual identifier.

In a further variation, the virtual switch is also associated with a second switch. The second switch is locally coupled to a second appliance, which is capable of providing the service and associated with the virtual appliance.

In a variation on this embodiment, during operation, the packet processor extracts information about a second service and a third appliance, which is capable of providing the second service and coupled to a third switch. The packet processor forwards a respective data requiring the second service toward the third switch.

In a further variation, the switch also includes a sequence module which receives a sequence of execution associated with the subnet, for the service and the second service. The sequence module also determines whether to forward a data frame belonging to the subnet to the appliance or the third appliance based on the sequence.

In a further variation, the packet processor encapsulates the data frame in a Transparent Interconnection of Lots of Links (TRILL) packet with a virtual routing bridge (RBridge) identifier as an egress RBridge identifier of the packet. This virtual RBridge identifier corresponds to the third switch.

In a variation on this embodiment, the service management module determines completion of the service for a data frame in response to receiving the data frame via the local port.

In a variation on this embodiment, the switch also includes a fabric switch management module which maintains a membership in a fabric switch. Such a fabric switch accommodates a plurality of switches and operates as a single logical switch.

BRIEF DESCRIPTION OF THE FIGURES

In the figures, like reference numerals refer to the same figure elements.

DETAILED DESCRIPTION

Figure 1A:
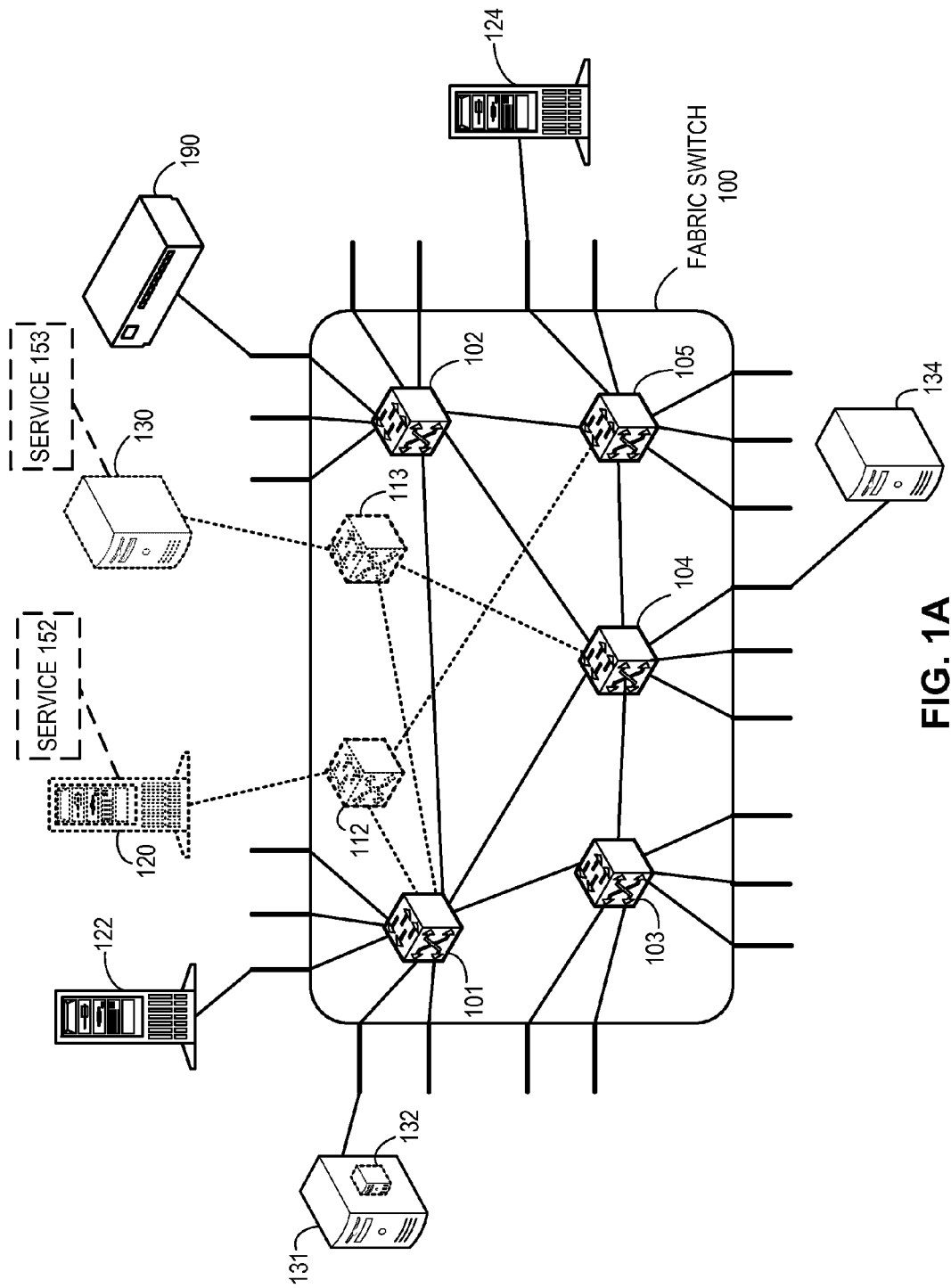
FIG. 1A illustrates an exemplary fabric switch with dynamic service insertion capability, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of dynamically adding a service in a fabric switch is solved by distributing configuration information of a respective appliance associated with the service across all member switches of the fabric switch. As a result, a respective member switch can obtain the service from any supporting appliance coupled to any member switch. An appliance coupled to a switch, which can be a fabric switch, provides specialized service to a network. Examples of an appliance can include, but are not limited to, a firewall, load balancer, intrusion detection/protection device, network analyzer, and network virtualizer. An appliance can be a physical device or a virtual machine running on a physical device. Typically, such an appliance is optimized for the performance of that specific service. In the traditional deployment of services in a network, when an appliance is added to a network, a respective switch in the network is required to be configured for accommodating the service provided by the appliance. For example, when a firewall is added, a respective switch in the network should be configured to forward traffic to the firewall. Such configuration can be tedious, repetitious, and error-prone.

Furthermore, a respective appliance is typically deployed in the data path of upstream or downstream traffic (which can be referred to as "north-south traffic"). For example, an appliance can be deployed at an aggregation router. However, recent growth in data centers has created demands for new services, often to traffic between servers and storage devices (which can be referred to as "east-west traffic"). Moreover, in today's networks, a respective appliance is required to be multitenant, where a single appliance can serve traffic belonging to different sub-networks (or subnets). On the other hand, the appliances providing a service can be located anywhere across a network, thereby distributing the traffic load of the network. As a result, traffic belonging to the same subnet can be served by different appliances. Configuring a network to support appliances which are simultaneously distributed and multitenant can be challenging.

To solve this problem, when an appliance is added to a member switch of a fabric switch (i.e., a switch which forms a fabric switch in conjunction with other member switches), the switch shares the location and the service provided by the appliance to the other member switches. In this way, the member switch exchanges operational and configuration data of the appliance with other member switches and integrates the appliance with the entire fabric switch. As a result, when connected to the fabric switch, the appliance automatically provides the service and its associated functionalities to the entire fabric switch. In some embodiments, one or more appliances providing a service are virtualized as a virtual appliance coupled to the fabric switch via a virtual member switch. The virtual switch is associated with the physical member switches coupled to the appliances providing the service. As a result, a respective member switch can simply forward a data frame belonging to a subnet which requires the service toward the virtual switch. Consequently, the data frame is eventually received by one of the member switches associated with the virtual switch. The member switch, in turn, forwards the data frame to the locally coupled appliance, which provides the service to the data frame. In this way, a service can be dynamically inserted via any member switch of a fabric switch without configuring individual switches in the fabric switch.

In some embodiments, the fabric switch is an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to an end device. In some further embodiments, the fabric switch is a Transparent Interconnection of Lots of Links (TRILL) network and a respective member switch of the fabric switch is a TRILL routing bridge (RBridge).

Although the present disclosure is presented using examples based on the TRILL protocol, embodiments of the present invention are not limited to networks defined using TRILL, or a particular Open System Interconnection Reference Model (OSI reference model) layer. For example, embodiments of the present invention can also be applied to a multi-protocol label switching (MPLS) network. In this disclosure, the term "fabric switch" is used in a generic sense, and can refer to a network operating in any networking layer, sub-layer, or a combination of networking layers.

In this disclosure, the term "service" is used in a generic sense, and can refer to any operation or group of operations providing specific functionality to a standalone or fabric switch operating in any network layer. Any functionality required by a switch can be referred to as a "service." Any physical or virtual device capable of providing a service to a switch can be referred to as an "appliance." An "appliance" can be a device separate from a switch, or a hardware or software module running in the switch.

The term "end device" can refer to a device coupled to a fabric switch. An end device can be a host, a conventional layer-2 switch, or any other type of network device. Additionally, an end device can be coupled to other switches or hosts further away from a network. An end device can also be an aggregation point for a number of network devices to enter the network. The terms "device" and "machine" are used interchangeably.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port in a fabric switch which exchanges data frames with an end device outside of the fabric switch. The term "inter-switch port" refers to a port which couples a member switch of a fabric switch with another member switch and is used for exchanging data frames between the member switches.

The term "switch identifier" refers to a group of bits that can be used to identify a switch. If the switch is an RBridge, the switch identifier can be an "RBridge identifier." The TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is used in a generic sense, is not limited to any bit format, and can refer to "RBridge ID," "RBridge nickname," or any other format that can identify an RBridge.

The term "Ethernet fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary fabric switch with dynamic service insertion capability, in accordance with an embodiment of the present invention. As illustrated in FIG. 1, a fabric switch 100 includes member switches 101, 102, 103, 104, and 105. Member switches in fabric switch 100 use edge ports to communicate to end devices and inter-switch ports to communicate to other member switches. For example, switch 102 is coupled to end device 190 via an edge port and to switches 101, 104, and 105 via inter-switch ports. Examples of end device 190 include, but are not limited to, a layer-2 switch, layer-3 router, top-of-the-rack switch, and physical or virtual host machine. In some embodiments, fabric switch 100 is a TRILL network; switches 101, 102, 103, 104, and 105 are RBridges; and data frames transmitted and received via inter-switch ports are encapsulated in TRILL headers.

Appliances 122 and 124 provide service 152 to fabric switch 100 and are coupled to member switches 101 and 105, respectively. Similarly, appliances 132 and 134 provide service 153 to fabric switch 100 and are coupled to member switches 101 and 104, respectively. Examples of a service include, but are not limited to, firewall, load balancing, intrusion detection/protection, network analysis, and network virtualization. Though appliance 134 is a physical machine, appliance 132 is a virtual machine running on a physical machine 131. Hence, fabric switch 100 can receive the same service (e.g., service 153) from a physical and a virtual device.

In some embodiments, when an appliance, such as appliance 122 is added to switch 101, switch 101 creates a notification message, which specifies corresponding service 152 and the association of appliance 122 with switch 101. Switch 101 then sends this notification message to other switches in fabric switch 100. Upon receiving the message, a respective switch, such as switch 102, associates service 152 with switch 101. During operation, switch 102 receives from end device 190 a data frame belonging to a subnet which requires service 152. Switch 102 identifies switch 101 to be associated with service 152 and forwards the data frame to switch 101. As result, when connected to fabric switch 100, appliance 122 automatically provides service 152 and its associated functionalities to all member switches of fabric switch 100. In this way, service 152 can be dynamically inserted into fabric switch 100 without configuring individual switches in fabric switch 100.

In some embodiments, appliances which provide a service to fabric switch 100 are virtualized as a single virtual appliance. In the example in FIG. 1A, when appliances 122 and 124 are coupled to fabric switch 100, switches 101 and 105, in conjunction with each other, virtualize appliances 122 and 124 as a virtual appliance 120 coupled to fabric switch 100 via a virtual member switch 112. Switches associated with a virtual switch can be referred to as partner switches. For example, switches 101 and 105 are the partner switches associated with virtual switch 112. Switches 101 and 105 send notification messages about virtual switch 112 and virtual appliance 120 to the other switches in fabric switch 100. One such message specifies that virtual appliance 120 is associated with service 152 and coupled to virtual switch 112. The same or a different message further specifies that virtual switch 112 is reachable via switches 101 and 105. Upon receiving the notification messages, other switches become aware of service 152, associated virtual appliance 120, and virtual switch 112. Similarly, appliances 132 and 134 are virtualized as a virtual appliance 130 coupled to a virtual switch 113, which is reachable via switches 101 and 104. Switch virtualization in a fabric switch and its associated operations, such as data frame forwarding, are specified in U.S. Patent Publication No. 2010/0246388, titled "Redundant Host Connection in a Routed Network," the disclosure of which is incorporated herein in its entirety.

During operation, switch 102 receives from end device 190 a data frame belonging to a subnet which requires service 152. Switch 102 identifies virtual appliance 120 to be associated with service 152. Switch 102 also identifies that virtual appliance 120 is coupled to virtual switch 112. Switch 102 then simply forwards the data frame toward virtual switch 112. In some embodiments, switch 102 encapsulates the data frame in a TRILL packet. The data frame is then forwarded to either switch 101 or 105. If only one of switches 101 and 105 is configured for the subnet, the data frame is forwarded to that specific switch. Suppose that switch 101 receives the frame. Switch 101, in turn, forwards the data frame to locally coupled appliance 122, which provides service 152 to the data frame. For example, if service 152 is a firewall service, appliance 122 checks whether the data frame should be forwarded to the subnet.

Upon receiving back the data frame from appliance 122, switch 101 checks whether the data frame requires any other service. If the data frame requires service 153 as well, switch 101 identifies appliance 132, which can provide service 153, to be a local appliance and forwards the data frame to appliance 132. When switch 101 receives the data frame back from appliance 132, switch 101 checks whether the data frame requires any other service. If not, switch 101 forwards the data frame toward its destination. In this way, fabric switch 100 receives services from appliances 122, 124, 132, and 134 without configuring individual switches in fabric switch 100.

Virtual switch 112 allows switches 102, 103, and 104 to simply forward data frames belonging to a subnet which requires service 152 toward virtual switch 112. The data frames reach either switch 101 or 105 based on the routing policy of fabric switch 100. In some embodiments, virtual appliance 120 can be logically coupled to switches 101 and 105, instead of virtual switch 112. Under such a scenario, instead of creating virtual switch 112, switches 101 and 105 advertise virtual appliance 120 to be a locally coupled appliance to switches 102, 103, and 104. As a result, switches 102, 103, and 104 send data frames belonging to a subnet which requires service 152 to either switch 101 or 105. However, without virtual switch 112, a respective switch has to explicitly choose either switch 101 or 105 to be an egress RBridge for sending the data frames. For example, switch 102 can choose switch 105, while switch 103 can choose switch 101 for forwarding data frames toward virtual appliance 120.

Figure 1B:
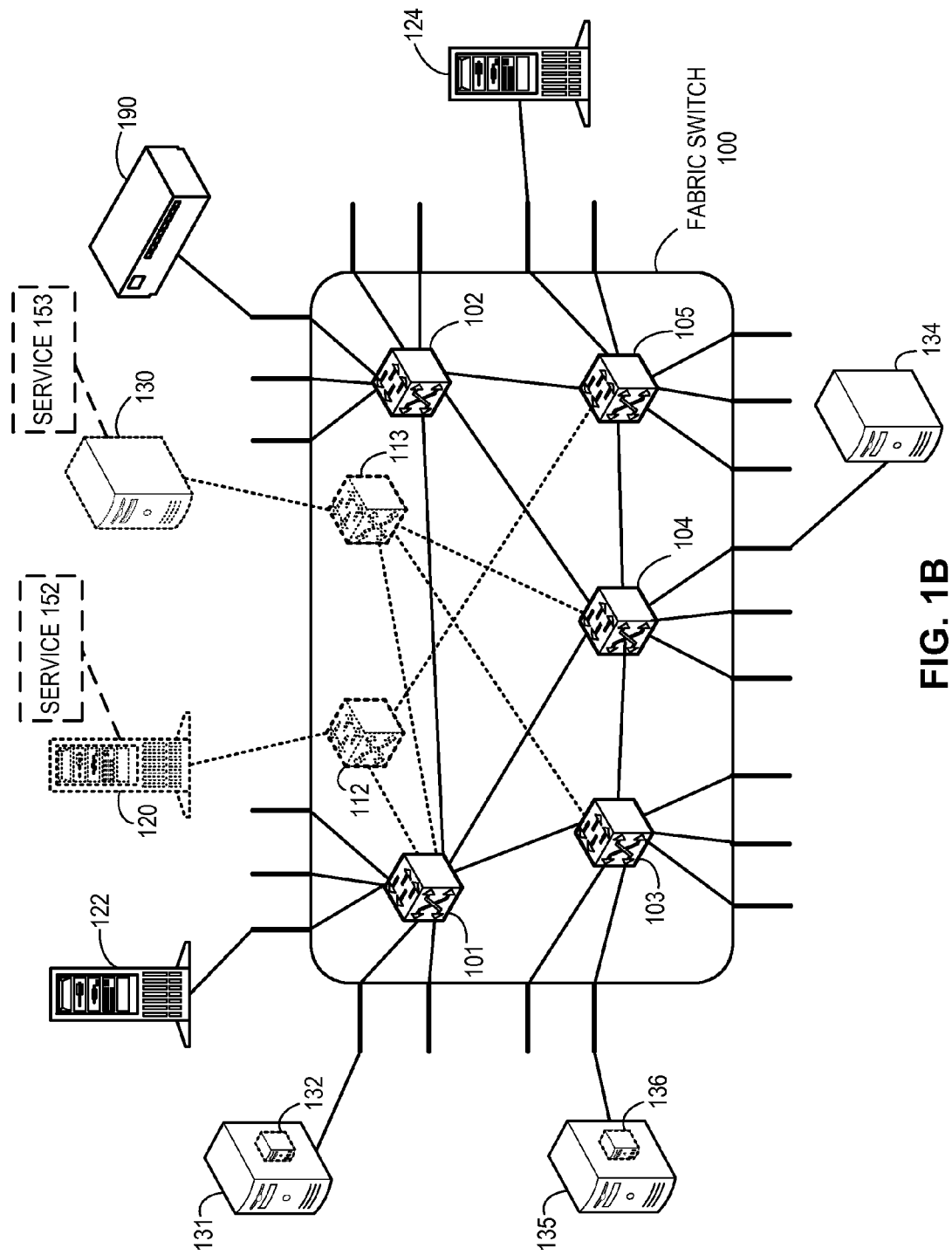
FIG. 1B illustrates how a new appliance for an existing service is dynamically added to a fabric switch in conjunction with the example in FIG. 1A, in accordance with an embodiment of the present invention.

A new appliance is added to fabric switch 100 can be associated with either an existing service or a new service. FIG. 1B illustrates how a new appliance for an existing service is dynamically added to a fabric switch in conjunction with the example in FIG. 1A, in accordance with an embodiment of the present invention. In this example, appliance 136, which provides existing service 153, is added to fabric switch 100. Appliance 136 is a virtual machine running on a physical machine 135. Hence, a new appliance added to fabric switch 100 can be a virtual machine. Because virtual appliance 130 and virtual switch 113 are already associated with service 153 in fabric switch 100, switch 103 is aware of service 153, associated virtual appliance 130, and virtual switch 113. In some embodiments, switch 103 sends a query message to other member switches in fabric switch 100 to identify the switches associated with virtual switch 113 (e.g., switches 101 and 104).

Upon detecting appliance 136, switch 103, in conjunction with switches 101 and 104, associates appliance 136 with virtual appliance 130. Furthermore, switch 103 becomes a partner switch associated with virtual switch 113. As a result, other member switches, such as switches 102 and 105, still perceive that only one appliance (e.g., virtual appliance 130) is providing service 153 to fabric switch 100. During operation, switch 102 receives from end device 190 a data frame belonging to a subnet which requires service 153. Switch 102 identifies that virtual appliance 130 is coupled to virtual switch 113. Switch 102 simply forwards the data frame toward virtual switch 113. Because switch 103 is now associated with virtual switch 113, the data frame can be forwarded to any of switches 101, 103, and 104. Suppose that switch 103 receives the data frame. Switch 103 then forwards the data frame to locally coupled appliance 136, which provides service 153 to the data frame.

Figure 1C:
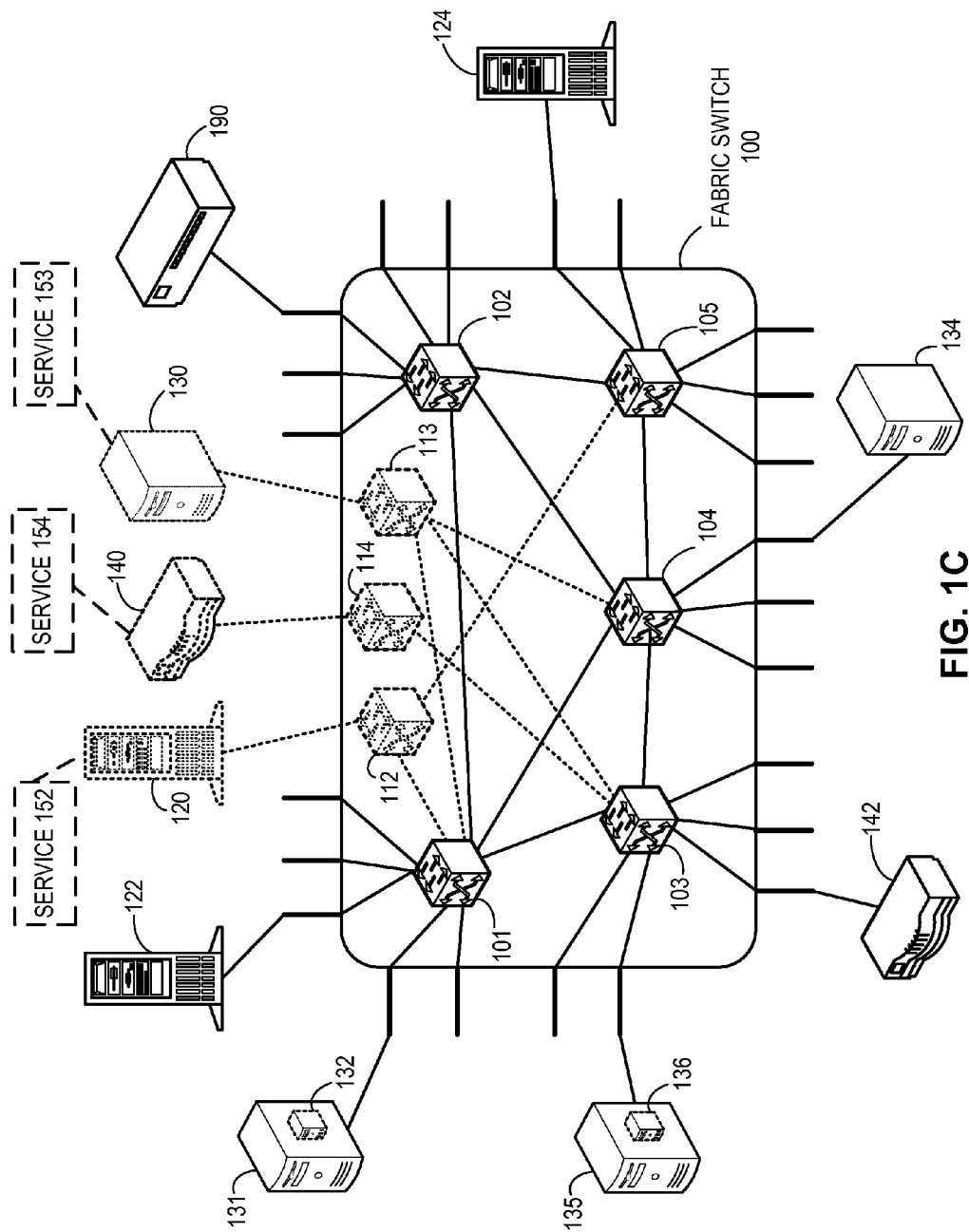
FIG. 1C illustrates how a new appliance for a new service is dynamically added to a fabric switch in conjunction with the example in FIG. 1B, in accordance with an embodiment of the present invention.

FIG. 1C illustrates how a new appliance for a new service is dynamically added to a fabric switch in conjunction with the example in FIG. 1B, in accordance with an embodiment of the present invention. In this example, appliance 142, which provides a new service 154, is added to fabric switch 100. Because service 154 is new, upon detecting appliance 142, switch 103 creates a virtual appliance 140 associated with service 154 in fabric switch 100. Switch 103 also creates a virtual switch 114 and sends a notification message to other member switches in fabric switch 100 notifying them that virtual switch 114 has joined fabric switch 100 and is reachable via switch 103. Switch 103 also notifies the other switches via the same or a different message that virtual appliance 140 can provide service 154 to fabric switch 100 and is coupled to virtual switch 114.

Upon receiving the messages, other switches detect virtual switch 114 to be another member switch and virtual appliance 140 to be a physical appliance coupled to virtual switch 114. These switches update their respective forwarding information accordingly. During operation, switch 102 receives from end device 190 a data frame belonging to a subnet which requires service 154. Switch 102 identifies that virtual appliance 140 is coupled to virtual switch 114. Switch 102 then forwards the data frame toward virtual switch 114. Because only switch 103 is associated with virtual switch 114, the data frame is forwarded to switch 103. When switch 103 receives the data frame, switch 103 forwards the data frame to locally coupled appliance 142, which provides service 154 to the data frame. In this way, service 154 can be dynamically inserted into fabric switch 100 only via switch 103 without manually configuring switches 101, 102, 104, and 105.

Dynamic Service Insertion

Figure 2:
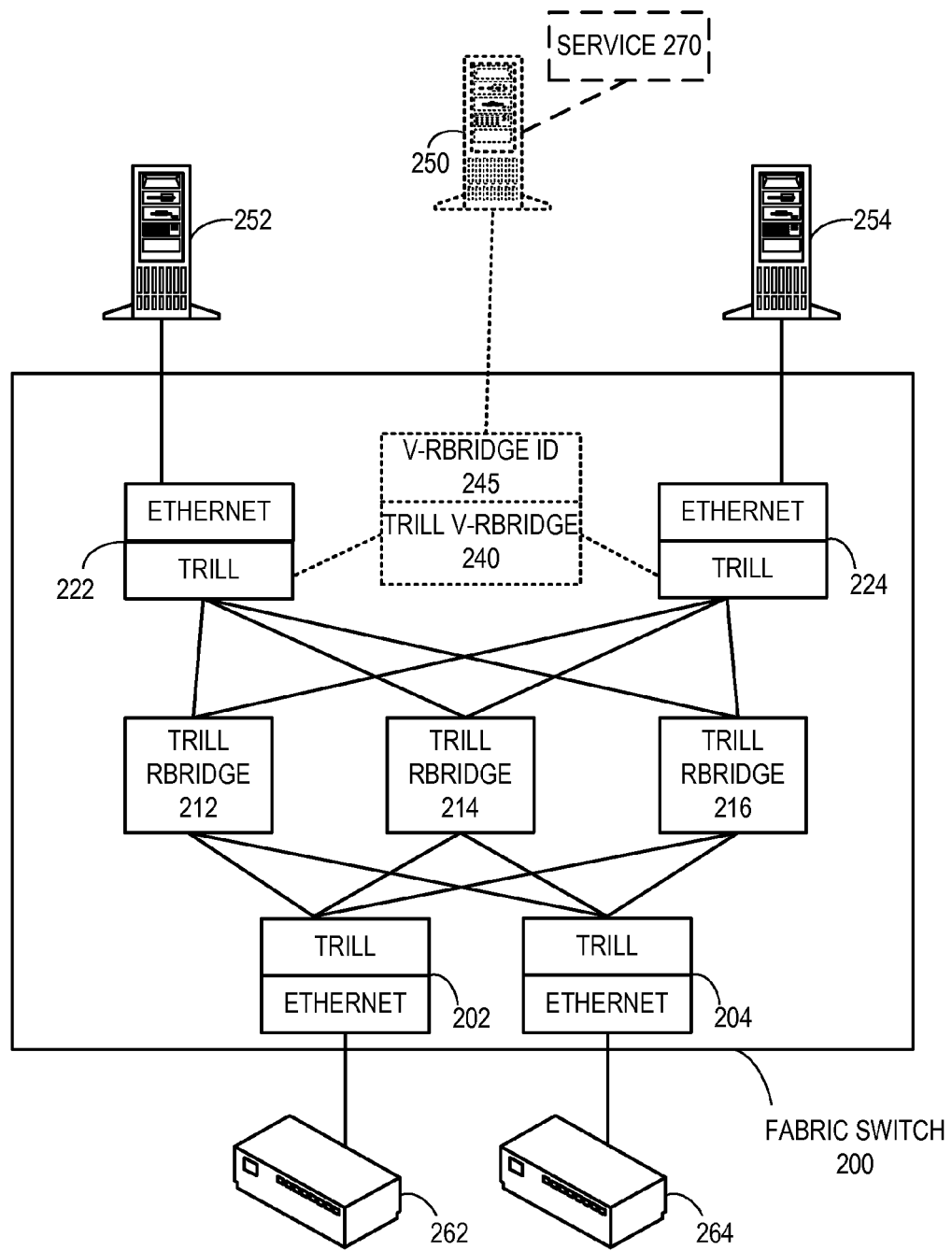
FIG. 2 illustrates an exemplary configuration of a fabric switch with dynamic service insertion capability, in accordance with an embodiment of the present invention.

FIG. 2 illustrates an exemplary configuration of a fabric switch with dynamic service insertion capability, in accordance with an embodiment of the present invention. In this example, a fabric switch 200 includes switches 212, 214, and 216. Fabric switch 200 also includes switches 202, 204, 222 and 224, each with a number of edge ports which can be coupled to external devices. For example, switches 202 and 204 are coupled with end devices 262 and 264 via Ethernet edge ports. Upon learning the media access control (MAC) addresses of end devices 262 and 264, switches 202 and 204 share the learned MAC addresses with rest of fabric switch 200. Similarly, switches 222 and 224 are coupled to appliances 252 and 254, also via Ethernet edge ports. Appliances 252 and 254 provide service 270 to fabric switch 200.

In some embodiments, switches in fabric switch 200 are TRILL RBridges and in communication with each other using TRILL protocol. These RBridges have TRILL-based inter-switch ports for connection with other TRILL RBridges in fabric switch 200. Although the physical switches within fabric switch 200 are labeled as "TRILL RBridges," they are different from conventional TRILL RBridge in the sense that they are controlled by the FC switch fabric control plane. In other words, the assignment of switch addresses, link discovery and maintenance, topology convergence, routing, and forwarding can be handled by the corresponding FC protocols. Particularly, each TRILL RBridge's switch ID or nickname is mapped from the corresponding FC switch domain ID, which can be automatically assigned when a switch joins fabric switch 200 (which is logically similar to an FC switch fabric).

Note that TRILL is only used as a transport between the switches within fabric switch 200. This is because TRILL can readily accommodate native Ethernet frames. Also, the TRILL standards provide a ready-to-use forwarding mechanism that can be used in any routed network with arbitrary topology (although the actual routing in fabric switch 200 is done by the FC switch fabric protocols). Embodiments of the present invention should be not limited to using only TRILL as the transport. Other protocols (such as multi-protocol label switching (MPLS) or Internet Protocol (IP)), either public or proprietary, can also be used for the transport.

When appliances 252 and 254 are coupled to fabric switch 200, switches 222 and 224, in conjunction with each other, virtualize appliances 252 and 254 as a virtual appliance 250 coupled to fabric switch 200 via a virtual member switch 240. In some embodiments, virtual switch 240 is a TRILL RBridge and assigned a virtual RBridge identifier 245. RBridges 222 and 224 send notification messages to RBridges 202, 204, 212, 214, and 216. The notification message specifies that virtual RBridge 240, which is associated with virtual RBridge identifier 245, is reachable via RBridges 222 and 224. RBridges 222 and 224 specify in the same message or in a different notification message that virtual appliance 250 is associated with service 270 and coupled to virtual switch 240.

Suppose that end devices 262 and 264 belong to a subnet which requires service 270. During operation, end device 262 sends a data frame to end device 264. RBridge 202 receives the data frame and detects the requirement of service 270 for the data frame. Based on the notification messages received from RBridges 222 and 224, RBridge 202 is aware of virtual appliance 250 and virtual RBridge 240. RBridge 202 encapsulates the data frame in a TRILL packet with virtual RBridge identifier 245 as the egress RBridge identifier and forwards the packet toward virtual RBridge 240.

RBridge 222 receives the packet via intermediate RBridge 212 and recognizes the packet to be destined to virtual RBridge 240. Because virtual RBridge 240 is associated with service 270 and the packet includes virtual RBridge identifier 245, RBridge 222 detects that the encapsulated data frame requires service 270. RBridge 222 extracts the data frame from the TRILL packet and forwards the data frame to locally coupled appliance 252. Upon receiving back the data frame from appliance 252, RBridge 222 identifies the destination MAC address of end device 264, encapsulates the data frame in a TRILL packet with an RBridge identifier of RBridge 204 as the egress RBridge identifier, and forwards the packet toward RBridge 204.

Figure 3A:
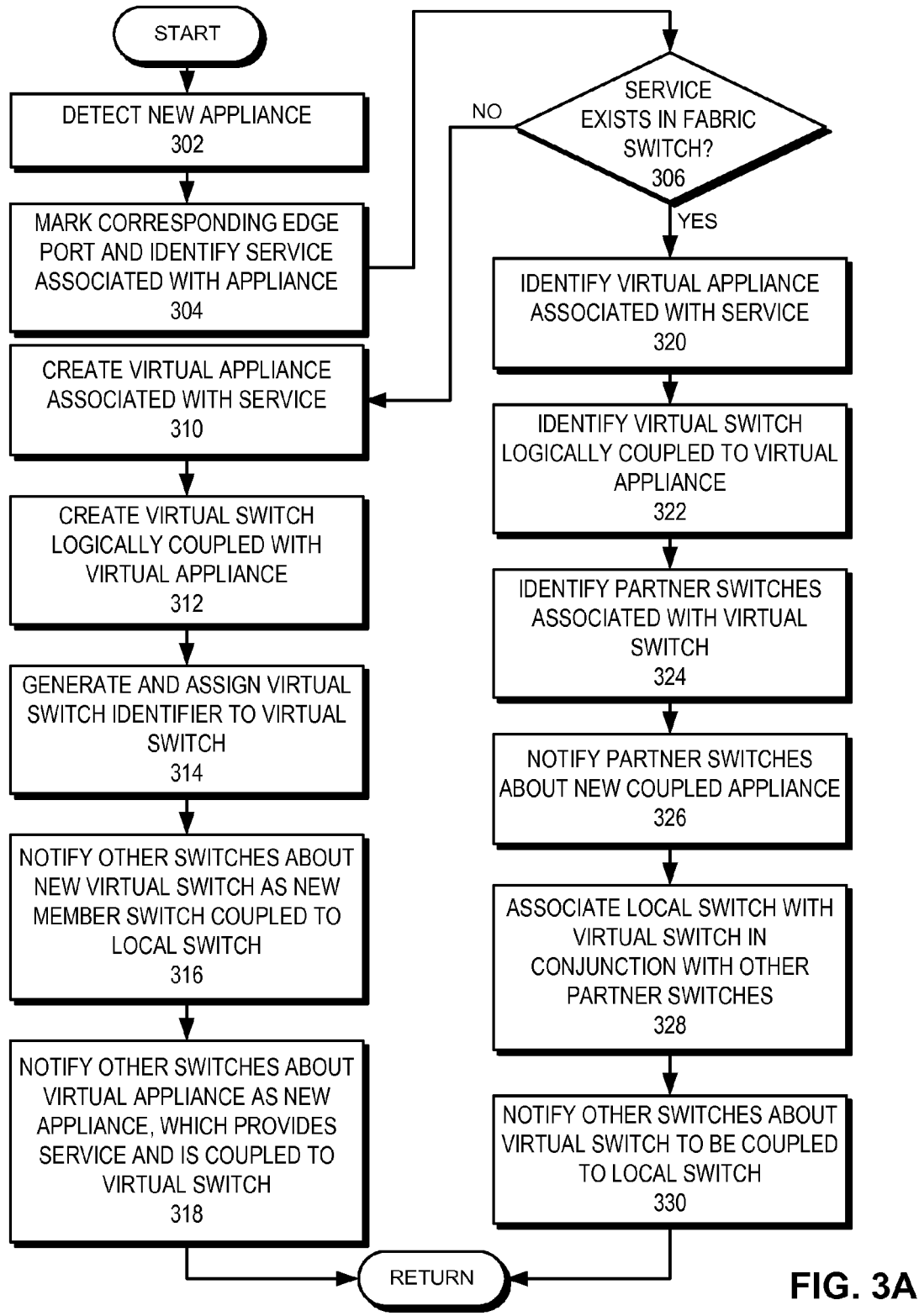
FIG. 3A presents a flowchart illustrating the process of a member switch of a fabric switch dynamically adding an appliance to the fabric switch, in accordance with an embodiment of the present invention.

In the examples in FIGS. 1B and 1C, upon detecting appliance 136, switch 103 identifies appliance 136 to be associated with an existing service 153, and associates appliance 136 with corresponding virtual appliance 130. On the other hand, upon detecting appliance 142, switch 103 identifies appliance 142 to be associated with a new service 154 and creates a virtual appliance 140 for service 154. Hence, a respective member switch can dynamically add an appliance for an existing service, or insert a new service and a corresponding appliance in a fabric switch. FIG. 3A presents a flowchart illustrating the process of a member switch of a fabric switch dynamically adding an appliance to the fabric switch, in accordance with an embodiment of the present invention. Upon detecting a new appliance (operation 302), the switch marks the edge port coupling the appliance and identifies the service associated with the appliance (operation 304). In this way, the switch can take appropriate action to the data frames received from the edge port. The switch then checks whether the service exists in the fabric switch (operation 306).

If the service exists, the switch identifies the virtual appliance associated with the service (operation 320) and the virtual switch logically coupled to the virtual appliance (operation 322). The switch identifies the partner switches associated with the virtual switch (operation 324) and notifies the partner switches about the newly coupled appliance (operation 326). In some embodiments, the switch sends a notification message comprising information about the new appliance to notify the identified partner switches. The switch, in conjunction with the partner switches, associates the local switch with the virtual switch (operation 328). Through operation 328, the switch becomes logically coupled to the virtual switch, and other partner switches start considering the switch as a new partner switch for the virtual switch. The switch notifies other switches in the fabric switch about the virtual switch to be coupled to the local switch (operation 330). As a result, other switches can forward data frames destined to the virtual switch toward the switch.

If the service does not exist, the appliance is providing a new service. The switch creates a virtual appliance associated with the service (operation 310) and a virtual switch logically coupled to the virtual appliance (operation 312). The switch then generates a virtual switch identifier and assigns the virtual switch identifier to the virtual switch (operation 314). The switch notifies other member switches about the new virtual switch as a new member switch coupled to the local switch (operation 316). In some embodiments, the switch sends a notification message comprising the virtual switch identifier to notify other member switches. The switch notifies other member switches about the newly coupled appliance which provides a new service and is coupled to the virtual switch (operation 318). Note that other member switches may consider the virtual appliance and the virtual switch to be physical devices and physically coupled to each other.

Figure 3B:
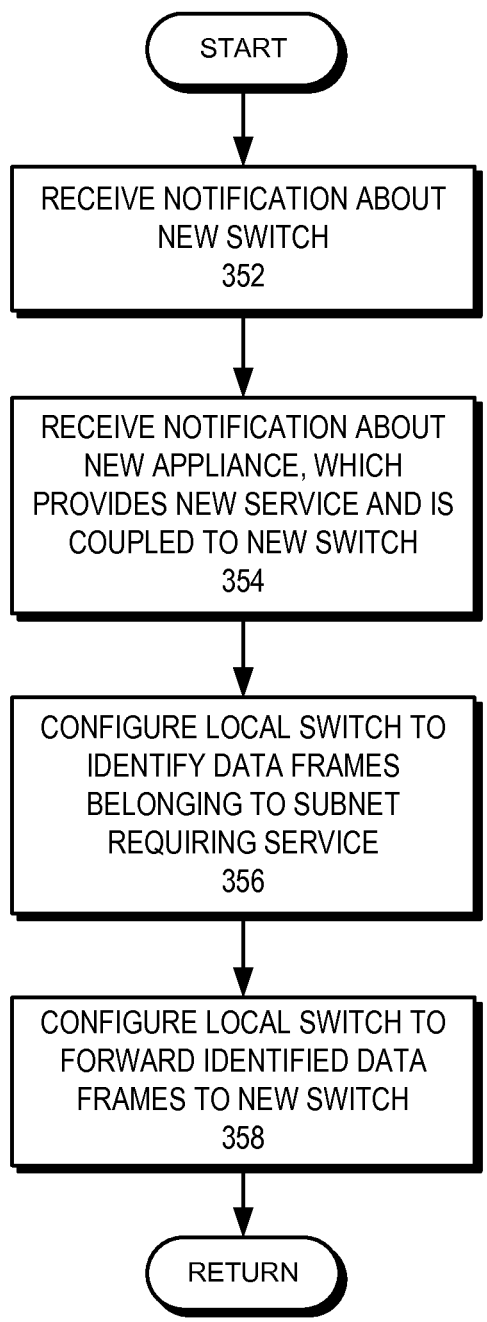
FIG. 3B presents a flowchart illustrating the process of a member switch of a fabric switch dynamically configuring a service, in accordance with an embodiment of the present invention.

FIG. 3B presents a flowchart illustrating the process of a member switch of a fabric switch dynamically configuring a service, in accordance with an embodiment of the present invention. The switch receives notifications about a new switch (operation 352) and a new appliance, which provides a new service and is coupled to the new switch (operation 354). The switch can receive these two notifications via a single message or a plurality of messages. Even though the new switch and new appliance are virtual devices logically coupled to each other, the switch may consider the appliance and the switch to be physical devices physically coupled to each other. The switch then becomes aware of the service available to the fabric. Hence, the switch configures the local switch to identify the data frames belonging to the subnet which requires the service (operation 356) and configures the local switch to forward the identified data frames to the new switch (operation 358).

Sequence of Execution

Figure 4:
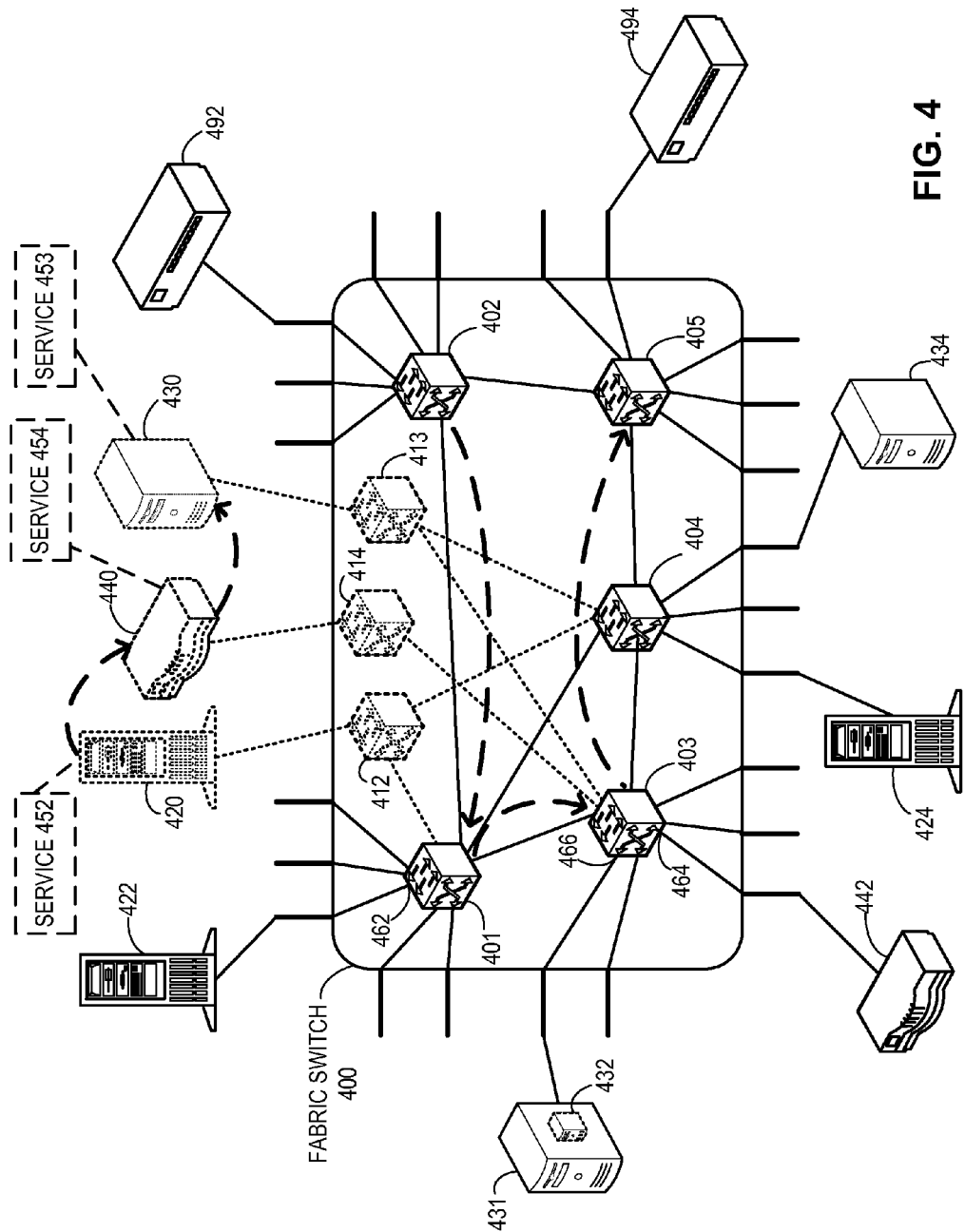
FIG. 4 illustrates an exemplary sequence of execution among dynamically inserted services in a fabric switch, in accordance with an embodiment of the present invention.

When a plurality of services are associated with a fabric switch, the services may require a specific sequence of execution. Such a sequence can be based on the interdependency and/or priority of the services. FIG. 4 illustrates an exemplary sequence of execution among dynamically inserted services in a fabric switch, in accordance with an embodiment of the present invention. As illustrated in FIG. 4, a fabric switch 400 includes member switches 401, 402, 403, 404, and 405. End devices 492 and 494 are coupled to fabric switch 400 via member switches 402 and 405, respectively. Examples of end devices 492 and 494 include, but are not limited to, a layer-2 switch, layer-3 router, top-of-the-rack switch, and physical or virtual host machine. In some embodiments, fabric switch 400 is a TRILL network; switches 401, 402, 403, 404, and 405 are RBridges; and data frames transmitted and received via inter-switch ports are encapsulated in TRILL headers.

Appliances 422 and 424 provide service 452 to fabric switch 400 and are coupled to member switches 401 and 404, respectively. Similarly, appliances 432 and 434 provide service 453 to fabric switch 400 and are coupled to member switches 403 and 404, respectively; and appliance 442 provides service 454 to fabric switch 400 and is coupled to member switch 403. Examples of a service include, but are not limited to, firewall, load balancing, intrusion detection/protection, network analysis, and network virtualization. Though appliance 434 is a physical machine, appliance 432 is a virtual machine running on a physical machine 431. Switches 401 and 404, in conjunction with each other, virtualize appliances 422 and 424 as a virtual appliance 420 coupled to fabric switch 400 via a virtual member switch 412. Similarly, appliances 432 and 434 are virtualized as a virtual appliance 430 coupled to a virtual switch 413; and appliance 442 is virtualized as a virtual appliance 440 coupled to a virtual switch 414.

Any of the member switches of fabric switch 400, such as switch 402, can receive a service configuration for a subnet. In some embodiments, a network administrator provides the service configuration to switch 402 (e.g., configures switch 402 with the service configuration). In this example, the service configuration specifies that the data frames belonging to the subnet require services 452, 453, and 454. The configuration also specifies the sequence of the required services to be services 452, 454, and 453. For example, if services 452, 453, and 454 correspond to firewall, load balancing, and intrusion detection, the sequence of the services specifies that a respective data frame belonging to the subnet should first be filtered with a firewall, then checked for intrusion, and finally forwarded based on a configured policy in a load balancer.

During operation, switch 402 receives from end device 492 a data frame, which belongs to the subnet and is destined to end device 494. Switch 402 identifies the initial service required for the data frame to be service 452, which is associated with virtual appliance 420. Switch 402 also identifies that virtual appliance 420 is coupled to virtual switch 412. Switch 402 forwards the data frame to virtual switch 412. The data frame is forwarded to switch 401 based on an internal routing policy of fabric switch 400. Switch 401 recognizes the received data frame to be destined to virtual switch 412 and realizes that the data frame requires service 452. Switch 401 forwards the data frame via port 462 to appliance 422, which provides service 452 to the data frame. For example, if service 452 is a firewall service, appliance 452 checks whether the data frame should be filtered or forwarded to the subnet. Because appliance 422 is coupled to switch 401 via port 462, when switch 401 receives the data frame back via port 462, switch 401 detects that appliance 422 has completed service 452.

Switch 401 checks for the next required service, if any, for the subnet and identifies service 454 to be the next service. Switch 401 identifies virtual appliance 440 associated with service 454. Switch 401 also identifies that virtual appliance 440 is coupled to virtual switch 414. Switch 401 forwards the data frame to virtual switch 414. Switch 403 receives the frame and detects that the data frame requires service 454. Switch 403 forwards the data frame via port 464 to appliance 442, which in turn, provides service 454 to the data frame. Because appliance 442 is coupled to switch 403 via port 464, when switch 403 receives the data frame back via port 464, switch 403 detects that appliance 442 has completed service 454.

Switch 403 then checks for the next required service, if any, for the subnet and identifies the next service to be service 453, which is associated with virtual appliance 430 coupled to virtual switch 413. Because switch 403 is a partner switch associated with virtual switch 413, switch 403 identifies locally coupled appliance 432 and forwards the data frame to appliance 432 via port 466. When switch 403 receives the data frame back via port 466, switch 403 realizes that appliance 432 has completed service 453. Upon completing the services, switch 403 forwards the data frame toward egress switch 405 based on the MAC address of end device 494.

Figure 5A:
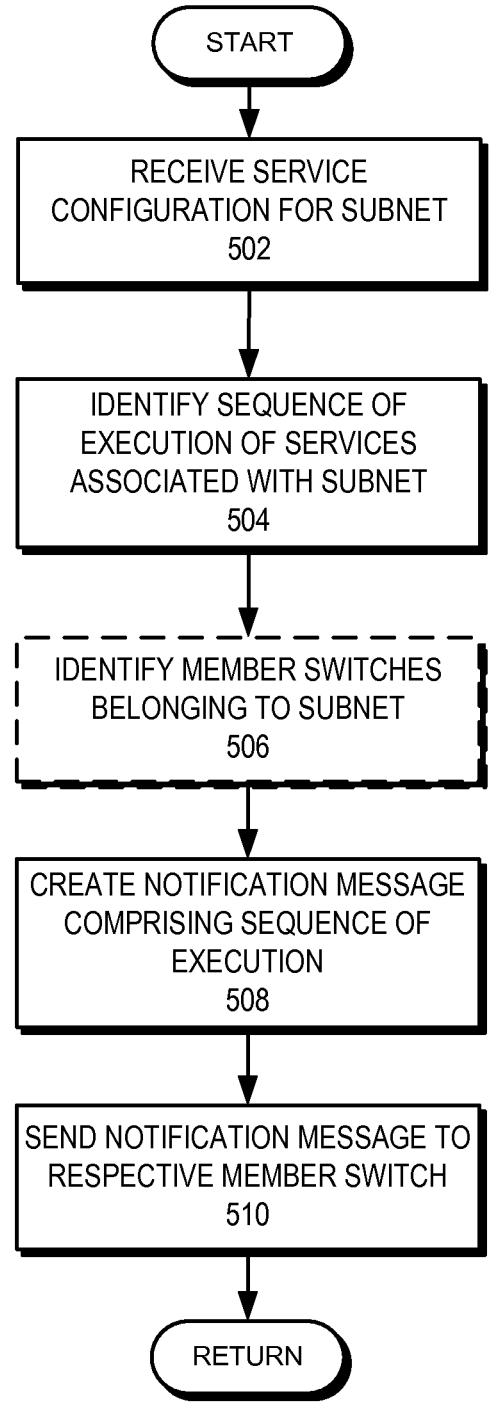
FIG. 5A presents a flowchart illustrating the process of a member switch distributing a sequence of execution for a subnet among dynamically inserted services in a fabric switch, in accordance with an embodiment of the present invention.

FIG. 5A presents a flowchart illustrating the process of a member switch distributing a sequence of execution for a subnet among dynamically inserted services in a fabric switch, in accordance with an embodiment of the present invention. Upon receiving a service configuration for a subnet (operation 502), the switch identifies the sequence of execution for the services associated with the subnet (operation 504). In some embodiments, a respective member switch can belong to one or more subnets. The switch can optionally identify the member switches belonging to the subnet (operation 506). The switch creates a notification message comprising the sequence of execution (operation 508) and sends the message to a respective member switch (operation 510). The message can be a control message specific to the fabric switch. In some embodiments, the switch sends the message to only the member switches belonging to the subnet.

Figure 5B:
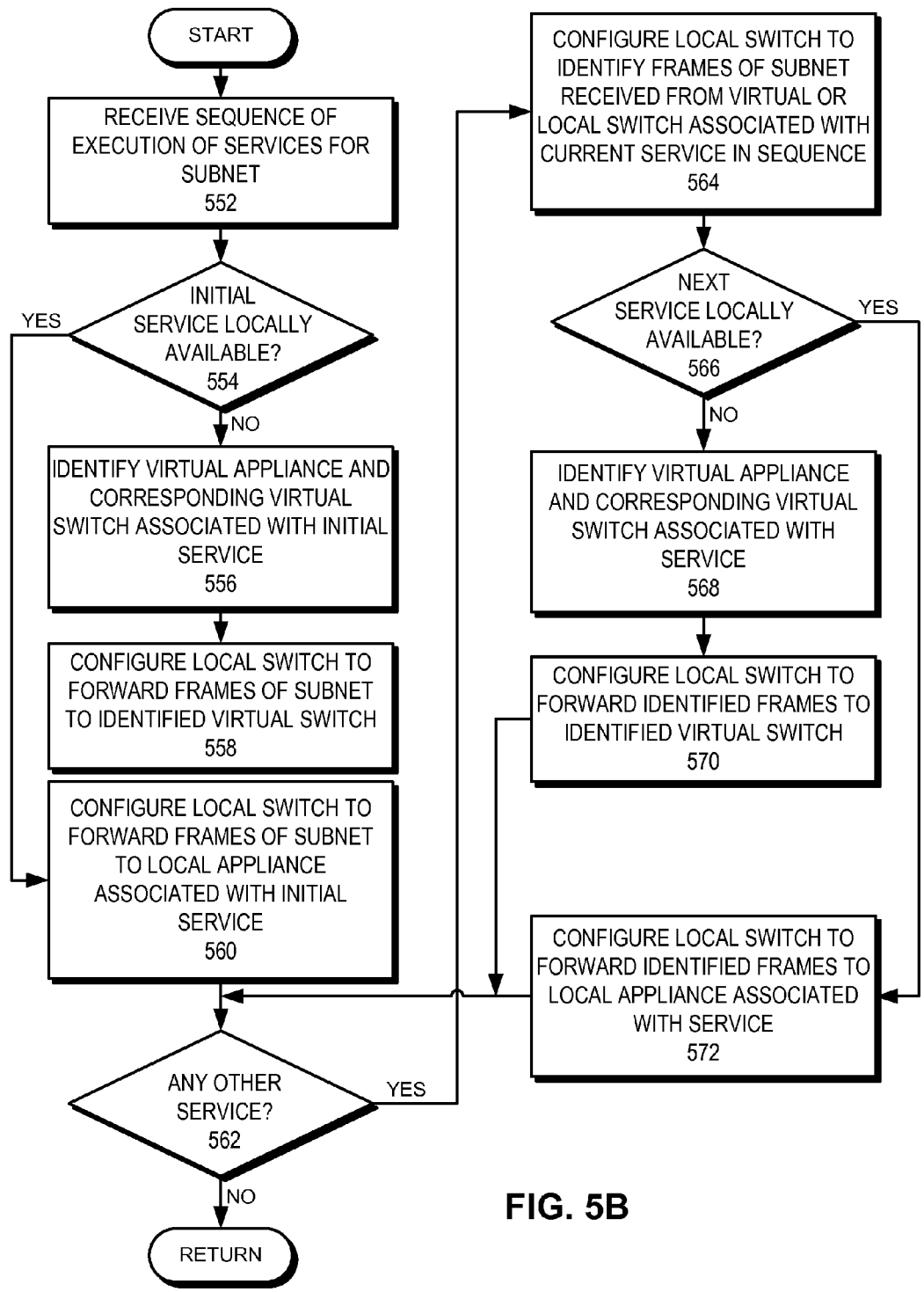
FIG. 5B presents a flowchart illustrating the process of a member switch configuring a sequence of execution for a subnet among dynamically inserted services in a fabric switch, in accordance with an embodiment of the present invention.

FIG. 5B presents a flowchart illustrating the process of a member switch configuring a sequence of execution for a subnet among dynamically inserted services in a fabric switch, in accordance with an embodiment of the present invention. The switch first receives a sequence of execution of services for a subnet (operation 552). The switch can receive the sequence of execution from a local configuration or a notification message from another member switch, as described in conjunction with FIG. 5A. The switch checks whether the initial service of the sequence is locally available (operation 554). If an appliance providing the service is coupled to the switch, the service is locally available. If the service is not locally available, the switch identifies the virtual appliance and the corresponding virtual switch associated with the initial service (operation 556). Note that the switch may consider the virtual appliance and the virtual switch to be physical devices and physically coupled to each other. The local switch configures itself to forward data frames of the subnet (i.e., data frames belonging to the subnet) to the identified virtual switch (operation 558). If the service is locally available, the local switch configures itself to forward frames of the subnet to the local appliance associated with the initial service (operation 560).

The switch checks whether the sequence has any other service (operation 562). If the sequence has more services, the switch configures the local switch to identify frames of the subnet received from the virtual or local switch associated with the current service in sequence (operation 564). For example, if the switch is a partner switch associated with the virtual switch, the switch can locally identify the frame, as described in conjunction with FIG. 4. Operation 564 ensures that the switch maintains the sequence of execution and facilitates detection of potential errors in the configuration of the sequence of execution.

The switch checks whether the next service of the sequence is locally available (operation 566). If the service is not locally available, the switch identifies the virtual appliance and the corresponding virtual switch associated with the service (operation 568). Note that the switch may consider the virtual appliance and the virtual switch to be physical devices and physically coupled to each other. The local switch configures itself to forward identified data frames to the identified virtual switch (operation 570). If the service is locally available, the local switch configures itself to forward the identified frames to the local appliance associated with the service (operation 572). The switch checks whether the sequence has any other service (operation 562) and continues to configure the local switch for the next services, if any.

Data Frame Processing

Figure 6A:
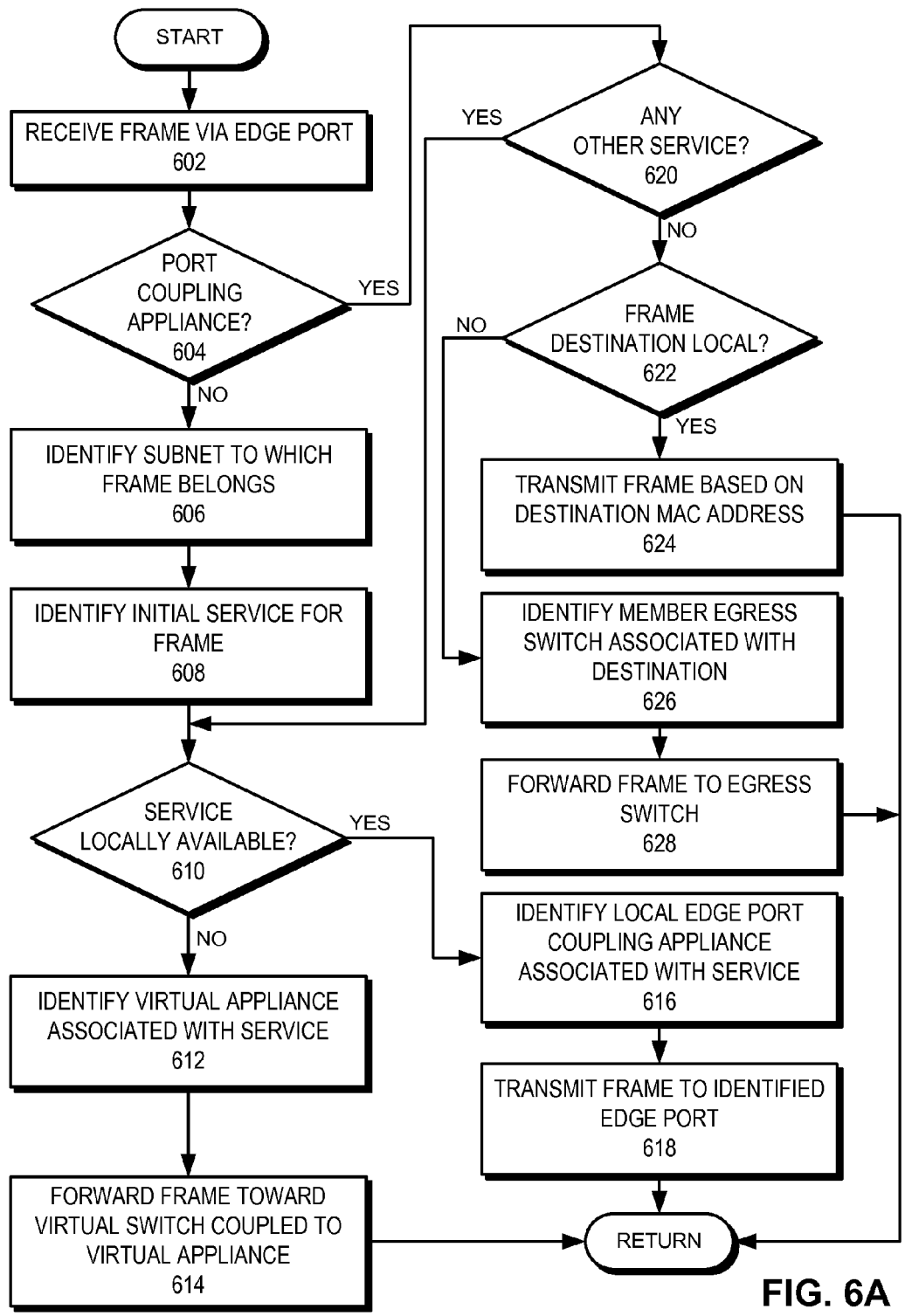
FIG. 6A presents a flowchart illustrating the process of a member switch of a fabric switch processing a data frame received from an edge port, in accordance with an embodiment of the present invention.

In the example in FIG. 2, member switches 202 and 222 couple an end device and an appliance via their respective edge ports. Hence, a member switch needs to distinguish between edge ports coupling an end device and an appliance. FIG. 6A presents a flowchart illustrating the process of a member switch of a fabric switch processing a data frame received from an edge port, in accordance with an embodiment of the present invention. Upon receiving a data frame via an edge port (operation 602), the switch checks whether the edge port couples an appliance (operation 604). In some embodiments, the switch marks an edge port coupling an appliance to distinguish the port from other edge ports, as described in conjunction with FIG. 3A.

If the port does not couple an appliance, the data frame is received from an end device. The switch identifies the subnet to which the data frame belongs (operation 606) and the initial service required for the data frame (operation 608). For a respective subnet, the switch can be configured with the required services and its corresponding order of execution, as described in conjunction with FIG. 5B. The switch checks whether the service is locally available (operation 610). A service is locally available if an appliance providing the service is coupled to a local edge port. If the service is not locally available, the switch identifies the virtual appliance associated with the service (operation 612) and forwards the frame toward the virtual switch coupled to the virtual appliance (operation 614).

If the service is locally available, the switch identifies the local edge port which couples the appliance associated with the service (operation 616) and transmits the frame to the identified edge port (operation 618). If the port couples an appliance (operation 604), the frame is from a local appliance after completion of a service. When the switch receives a data frame from an edge port coupling an appliance, the switch detects that the appliance has completed the associated service and the data frame is ready for further processing. For example, if the appliance is a firewall and if the data frame should not be forwarded to the subnet, the data frame is filtered at the firewall. If the switch receives the data frame back via the edge port coupling the firewall, the switch perceives the frame to be "allowable" for forwarding to the subnet.

The switch checks whether the sequence of execution for the subnet has any other service (operation 620). If so, the switch checks whether that service is locally available (operation 610) and continues to take action on the frame. If the sequence of execution for the subnet does not have any other service, the frame is ready for forwarding to its destination. The switch checks whether the destination of the frame is local (operation 622). If the destination is local, the switch transmits the frame based on the destination MAC address of the data frame (operation 624). For example, when the destination is a local end device, the switch transmits the frame to the edge port from which the switch has learned the MAC address of the end device. If the destination of the frame is not local, the switch identifies the member egress switch associated with the destination (operation 626) and forwards the data frame to the egress switch (operation 628). Because a respective member switch in a fabric switch shares the locally learned MAC addresses with other member switches, a respective member switch is aware of all end devices coupled to the entire fabric switch. In some embodiments, the switch encapsulates the data frame in a TRILL packet, sets the identifier of the egress switch as the egress RBridge identifier of the packet, and forwards the packet to the egress RBridge.

Figure 6B:
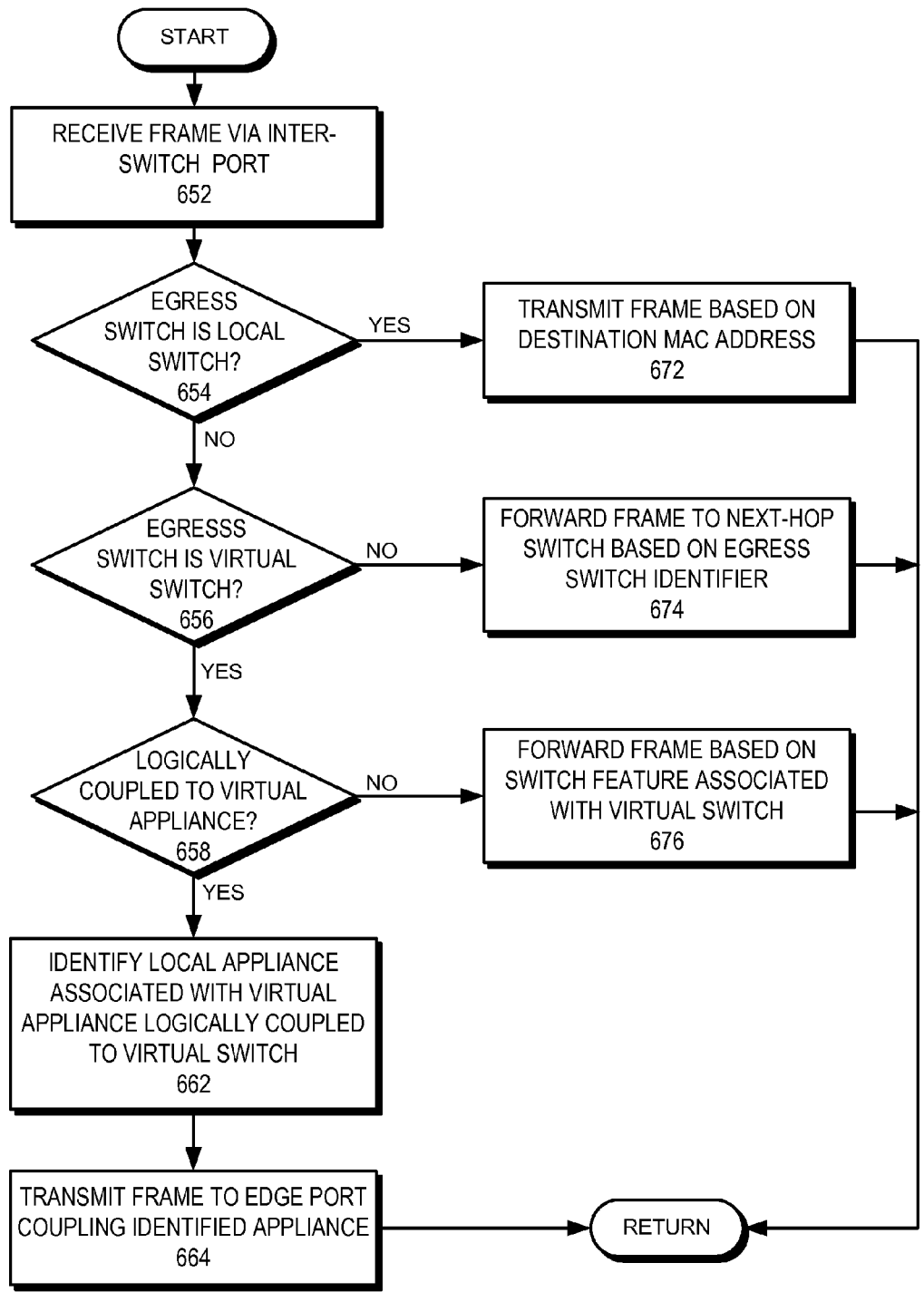
FIG. 6B presents a flowchart illustrating the process of a member switch of a fabric switch processing a data frame received from an inter-switch port, in accordance with an embodiment of the present invention.

FIG. 6B presents a flowchart illustrating the process of a member switch of a fabric switch processing a data frame received from an inter-switch port, in accordance with an embodiment of the present invention. Upon receiving a data frame via an inter-switch port (operation 652), the switch checks whether the egress switch for the received data frame is the local switch (operation 654). If so, the switch transmits the data frame based on the destination MAC address of the data frame (operation 672), as described in conjunction with FIG. 6A. If the egress switch is not the local switch, the switch checks whether the egress switch for the received data frame is a virtual switch (operation 656). In some embodiments, the received data frame is encapsulated in a TRILL packet and the switch determines whether the egress switch for the received frame is the local or a virtual switch based on the egress RBridge identifier of the packet.

If the egress switch of the frame is not a local or virtual switch, the data frame is destined for another switch. The switch forwards the data frame to the next-hop switch based on the egress switch identifier (operation 674). In some embodiments, the data frame is encapsulated in a TRILL packet. Under such a scenario, the switch identifies the next-hop switch based on the egress RBridge identifier of the packet and sets the MAC address of the next-hop switch as the outer MAC address of the packet. If the egress switch of the frame is not the local switch but is a virtual switch (operations 654 and 656), the switch checks whether the virtual switch is logically coupled to a virtual appliance (operation 658). If the egress switch of the frame is not the local switch but is a virtual switch logically coupled to a virtual appliance, the switch identifies the local appliance associated with the virtual appliance, which is logically coupled to the virtual switch (operation 662) and transmits the data frame to the edge port coupling the identified appliance (operation 664).

If the egress switch of the frame is not the local switch but is a virtual switch not logically coupled to a virtual appliance (operations 654, 656, and 658), the virtual switch is associated with a different feature of the switch, such as virtual link aggregation, as specified in U.S. Patent Publication No. 2010/0246388, titled "Redundant Host Connection in a Routed Network;" or storage network virtualization, as specified in U.S. patent application Ser. No. 13/669,357, titled "Integrated Fibre Channel Support in an Ethernet Fabric Switch," by inventors Phanidhar Koganti and Suresh Vobbilisetty, filed 5 Nov. 2012," the disclosure of which is incorporated by reference herein. Hence, the switch forwards the data frame based on the switch feature associated with the virtual switch (operation 676).

Exemplary Switch

Figure 7:
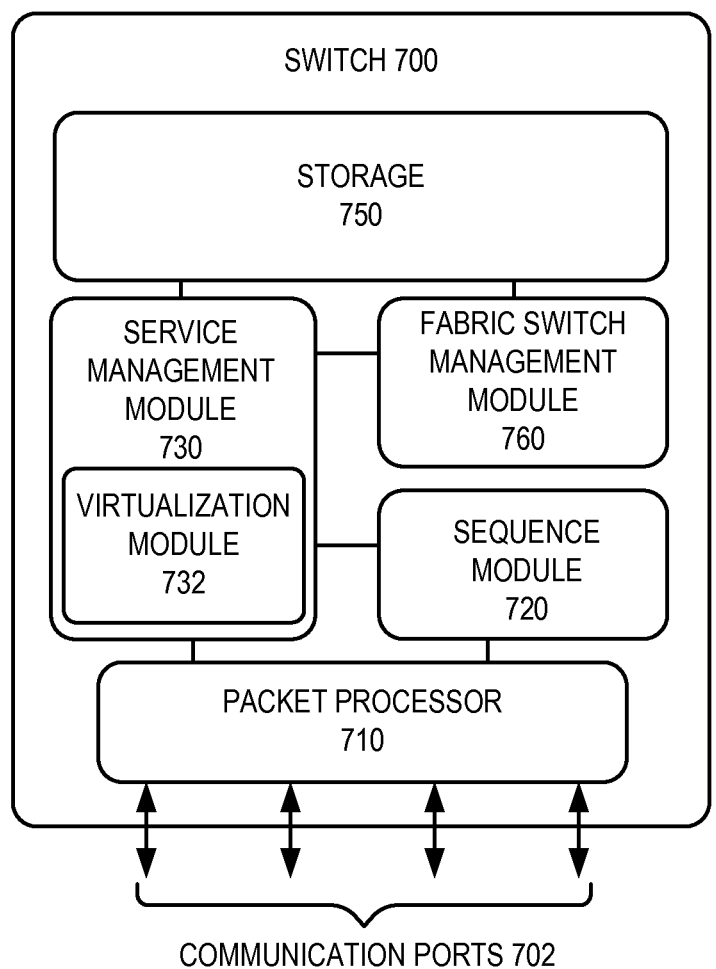
FIG. 7 illustrates an exemplary member switch with dynamic service insertion capability in a fabric switch, in accordance with an embodiment of the present invention.

FIG. 7 illustrates an exemplary member switch with dynamic service insertion capability in a fabric switch, in accordance with an embodiment of the present invention. In this example, a switch 700 includes a number of communication ports 702, a sequence module 720, a service management module 730, a packet processor 710, and a storage 750. In some embodiments, switch 700 may maintain a membership in a fabric switch, wherein switch 700 also includes a fabric switch management module 760. Fabric switch management module 760 maintains a configuration database in storage 750 that maintains the configuration state of a respective switch within the fabric switch. Fabric switch management module 760 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format.

During operation, service management module 730 detects an appliance coupled to switch 700 via one of communication ports 702. Service management module 730 identifies the service provided by the appliance. Upon detecting the appliance, packet processor 710 constructs a notification message comprising information about the service and the appliance for a remote switch in the fabric switch. When the remote switch receives the notification message, the remote switch dynamically configures the local switch to send a respective data frame requiring the service to switch 700. Upon receiving a data frame belonging to a subnet which requires the service, packet processor 710 forwards the packet to the appliance via the communication port. When packet processor 710 receives the data frame back via the same communication port, service management module 730 considers the service to be completed for the data frame, as described in conjunction with FIG. 2.

In some embodiments, the switch also includes a virtualization module 732, which virtualizes the appliance and any other appliance providing the service as one virtual appliance, as described in conjunction with FIG. 3A. The virtualization module 732 can also virtualize the switch and any other switch in the fabric switch associated with the service as a virtual switch, as described in conjunction with FIG. 3A. While doing so, the virtualization module 732 generates a virtual identifier for the virtual switch. Packet processor 710 constructs a second notification message which presents the virtual switch to be coupled to the virtual appliance.

When a different member switch in the fabric switch notifies switch 700 about a second service, the packet processor forwards a respective data frame belonging to a subnet requiring the second service toward that other member switch. This other member switch can be a virtual switch identified by a virtual switch identifier. In some embodiments, the virtual switch identifier is a virtual RBridge identifier. Under such a scenario, packet processor 710 encapsulates the data frame in a TRILL packet with the virtual RBridge identifier as egress RBridge identifier of the packet, as described in conjunction with FIG. 2. Sequence module 720, upon receiving a sequence of execution associated with the subnet, determines whether to forward a data frame belonging to the subnet to the appliance or the appliance coupled to the virtual switch based on the sequence, as described in conjunction with FIG. 5B.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method for dynamic service insertion in an Ethernet fabric switch. In one embodiment, the switch includes a service management module and a packet processor. During operation, the service management module identifies a service provided by an appliance coupled to the switch via a local port. The packet processor constructs a notification message for a remote switch. The notification message includes information about the service and the appliance. In this way, the switch allows the remote switch to request the service.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
service management circuitry configured to:
identify an appliance and a service provided by the appliance via an edge port of the switch; and
marking the edge port of the switch to be associated with the appliance; and
packet processing circuitry configured to:
in response to identifying the appliance, construct for a remote switch a notification message comprising information about the service and the appliance, wherein the switch and the remote switch are member switches of a network of interconnected switches, wherein a fabric identifier identifies the network of interconnected switches and is assigned to the switch and the remote switch, and wherein the information about the appliance indicates that the appliance is reachable via the switch; and
determine that a data frame from the remote switch requires the service.

2. The switch of claim 1, wherein the appliance is a virtual appliance, wherein the virtual appliance is associated with one or more appliances providing the service.

3. The switch of claim 2, further comprising virtualization circuitry configured to generate a virtual switch identifier of a virtual switch associated with the switch; and
wherein the packet processing circuitry is further configured to include in the notification message the virtual switch identifier, wherein the notification message indicates that the appliance is reachable via the virtual switch.

4. The switch of claim 3, wherein the virtual switch is further associated with a second switch; and
wherein the second switch is coupled to a second appliance capable of providing the service and associated with the virtual appliance.

5. The switch of claim 1, wherein the packet processing circuitry is further configured to:
extract information about a second service and a third appliance, wherein the third appliance is capable of providing the second service and reachable via a third switch; and
determine the third switch as an egress switch for a respective data frame requiring the second service.

6. The switch of claim 5, further comprising sequence circuitry configured to:
receive a sequence of execution for the service and the second service, wherein the sequence is associated with a subnet; and
determine whether to forward a data frame belonging to the subnet to the appliance or the third appliance based on the sequence.

7. The switch of claim 5, wherein the packet processing circuitry is further configured to encapsulate the data frame with an encapsulation header comprising a switch identifier as an egress switch identifier; and
wherein the switch identifier is associated with the third switch.

8. The switch of claim 1, wherein the service management circuitry is further configured to determine completion of the service for the data frame in response to receiving the data frame via the edge port.

9. The switch of claim 1, wherein inter-switch packets within the network of interconnected switches is encapsulated with an encapsulation header.

10. A method, comprising:
identifying an appliance and a service provided by the appliance via an edge port of a switch;
marking the edge port of the switch to be associated with the appliance;
in response to identifying the appliance, constructing for a remote switch a notification message comprising information about the service and the appliance, wherein the switch and the remote switch are member switches of a network of interconnected switches, wherein a fabric identifier identifies the network of interconnected switches and is assigned to the switch and the remote switch, and wherein the information about the appliance indicates that the appliance is reachable the switch; and
determining that a data frame from the remote switch requires the service.

11. The method of claim 10, wherein the appliance is a virtual appliance, wherein the virtual appliance is associated with one or more appliances providing the service.

12. The method of claim 11, further comprising:
generating a virtual switch identifier of a virtual switch associated with the switch; and
including in the notification message the virtual switch identifier, wherein the notification message indicates that the appliance is reachable via the virtual switch.

13. The method of claim 12, wherein the virtual switch is further associated with a second switch; and
wherein the second switch is coupled to a second appliance capable of providing the service and associated with the virtual appliance.

14. The method of claim 10, further comprising:
extracting information about a second service and a third appliance, wherein the third appliance is capable of providing the second service and reachable via a third switch; and
determining the third switch as an egress switch for a respective data frame requiring the second service.

15. The method of claim 14, further comprising:
receiving a sequence of execution for the service and the second service, wherein the sequence is associated with a subnet; and
determining whether to forward a data frame belonging to the subnet to the appliance or the third appliance based on the sequence.

16. The method of claim 14, further comprising encapsulating the data frame with an encapsulation header comprising a switch identifier as an egress switch identifier; and wherein the switch identifier is associated with the third switch.

17. The method of claim 10, further comprising determining completion of the service for the data frame in response to receiving the data frame via the edge port.

18. The method of claim 10, wherein inter-switch packets within the network of interconnected switches is encapsulated with an encapsulation header.

19. A non-transitory computer-readable storage medium storing instructions that when executed by a computer cause the computer to perform a method for securing a database configuration from undesired modifications, the method comprising:
  identifying an appliance and a service provided by the appliance via an edge port of a switch;
  marking the edge port of the switch to be associated with the appliance;
  in response to identifying the appliance, constructing for a remote switch a notification message comprising information about the service and the appliance, wherein the switch and the remote switch are member switches of a network of interconnected switches, wherein a fabric identifier identifies the network of interconnected switches and is assigned to the switch and the remote switch, and wherein the information about the appliance indicates that the appliance is reachable via the switch; and
  determining that a data frame from the remote switch requires the service, wherein the appliance is not coupled to a local port of the remote switch, and wherein the fabric identifier is assigned to the switch and the remote switch.

20. The computer-readable storage medium of claim 19, wherein the appliance is a virtual appliance, wherein the virtual appliance is associated with one or more appliances providing the service; and
wherein the method further comprises:
  generating a virtual switch identifier of a virtual switch associated with the switch; and
  including in the notification message the virtual switch identifier, wherein the notification message indicates that the virtual appliance is reachable via the virtual switch.

21. A switch means, comprising:
a service management means for:
  identifying an appliance means and a service provided by the appliance means via an edge port of the switch means; and
  marking the edge port of the switch to be associated with the appliance; and
a packet processor means for:
  in response to identifying the appliance, constructing for a remote switch means a notification message comprising information about the service and the appliance means, wherein the switch means and the remote switch means are member switches of a network of interconnected switch means, wherein a fabric identifier identifies the network of interconnected switch means and is assigned to the switch means and the remote switch means, and wherein the information about the appliance means indicates that the appliance means is reachable via the switch means; and
  determining that a data frame from the remote switch means requires the service.

* * * * *